June 9, 1959  L. HEIJNE ET AL  2,890,359
CAMERA TUBE
Filed June 15, 1954

INVENTOR.
L. HEIJNE
J. DORRESTEIN
H. BRUINING
P. SCHAGEN

BY Fred M. Vogel
AGENT

2,890,359

CAMERA TUBE

Leopold Heijne, Jan Dorrestein, Hajo Bruining, and Pieter Schagen, Eindhoven, Netherlands, assignors, by mesne assignments, to North American Philips Company, Inc., New York, N.Y., a corporation of Delaware Application June 15, 1954, Serial No. 436,923

Claims priority, application Netherlands June 13, 1953

11 Claims. (Cl. 313—65)

Camera tubes, more particularly camera tubes for television purposes, are known in which the image electrode is constituted by a layer of semi-conductive material, the electrical resistance of which varies its value when the electrode is struck by light, X-rays and sometimes also by electrons. Semi-conductive materials having this property are referred to hereinafter as photoconductive materials.

It has been known for a long time that photo-conductive materials of the aforesaid kind may be constituted of a small number of elements and a number of polar substances, such for example as the sulphides, oxides and halogenides of various metals. A serviceable image electrode in a camera tube must have a plurality of properties, among which, apart from a reasonable sensitivity, a long discharge time (RC-time) of the unexposed image electrode may be considered as the most important one; this becomes manifest in a low dark current and a rapid response of the image electrode resistance to variations in radiation intensity. The discharge time must be long compared with the time interval between two successive scannings of the same image element. The rate at which the image electrode responds to variations in radiation intensity may be characterized by the rise time and the decay time, which may be derived from the curves indicating the variation of the resistance as a function of time with abrupt variations in radiation intensity. For practical use the decay time and also the rise time must be shorter than the aforesaid time interval between two successive scannings of the same image element.

The use of many known photo-conductive substances for the image electrode in a camera tube has proved to be a failure, since all requirements for practical use could not be fulfilled at the same time.

The invention has for its object to provide a measure yielding material improvement in this respect particularly by increasing the discharge time of the image electrode, which favourably affects the decay time, the rise time and often also the sensitivity.

According to the invention, the photo-conductive image electrode of a camera tube is constituted by a layer of semi-conductive material having regions of different conductivity type lying one behind the other in the direction of thickness of the layer.

For the sake of clarity it may be observed that with semi-conductors two different or, more precisely, opposite types of conductivity are distinguished; with the first type the conductivity is provided by electrons (n-conductivity type), with the second, on the contrary, by "holes" or "defect electrons," which may be considered as positive charges (n-conductivity type). A method of providing a semi-conductive material of given conductivity type consists in introducing small quantities of "impurities" into the semi-conductive material. If the semi-conductive material is a polar substance, i.e. a substance containing various elements, the atoms of which have different electron activity, the type of conductivity may, as an alternative, be varied by providing in it an element in excessive or deficient quantity compared with the stoichiometrical quantity.

In the camera tube according to the invention the image electrode is preferably made mainly of lead monoxide, in which an n-conductivity zone is obtained by introducing an adequate quantity of bismuth or antimony atoms into the tube. A zone of the opposite, i.e. the p-conductivity type may be obtained by an excess quantity of oxygen atoms in the zone concerned.

The image electrode of a camera tube according to the invention has a blocking effect, which is to be ascribed to the presence of a so-called n-p barrier or junction in the boundary between two adjacent zones of different conductivity. This blocking effect may be operative in both directions, if the image electrode has two n-p barriers of opposite directions. The adavntageous properties of the camera tube according to the invention are fully utilised, if the potential difference between the front side and the rear side of the image electrode has a polarity for which the image electrode exhibits a blocking effect.

In a camera tube according to the invention the image electrode preferably has a zone of p-conductivity on its free surface, whereas the n-conductivity zone is adjacent the signal electrode. In a camera tube comprising such an image electrode, the latter may be scanned by slow electrons, so that the free surface of the image electrode is stabilized on cathode potential. Then the signal electrode must be kept at positive potential relative to the free surface of the image electrode. This camera tube is also suitable for scanning by rapid electrons, in which case the polarity of the potential difference at the image electrode corresponds with the aforesaid polarity. As an alternative, with the scanning by rapid electrons, the order of succession of the zones in the image electrode may be reversed; in this case, however, the signal electrode must have a negative voltage relative to the stabilisation potential of the surface of the image electrode.

The image electrode for use in a camera tube according to the invention is preferably made by applying a thin intermediate layer of a material containing atoms which upon being absorbed in the semi-conductive material used for the image electrode provide a definite conductivity type of this semi-conductive material, to a layer of good conductivity, which may be applied to a support and which constitutes the signal electrode. To this intermediate layer, which may for example be applied by vaporisation, is then applied the semi-conductive material of the image electrode, after which by thermal treatment atoms of the said kind are brought from the intermediate layer into the zone of the semi-conductive layer adjacent the intermediate layer. The intermediate layer preferably already contains the substance used for the semi-conductive layer. If the material for the image electrode is, for example lead monoxide, the intermediate layer may contain bismuth or antimony or the trioxides or trisulphides of these elements in order to obtain a zone adjacent the signal electrode having n-conductivity. If trioxide or trisulphide is used, the intermediate layer may be made for a large part of lead monoxide. The use of the material of the image electrode in the intermediate layer facilitates the production of the zone of the desired conductivity.

The zone of the opposite conductivity may be obtained on the free surface of the image electrode during the aforesaid thermal treatment by causing this surface to absorb atoms of an element providing the desired conductivity for the material of the image electrode. This may be realized by carrying out the thermal treatment in a gaseous atmosphere containing a sufficient concentration of the atoms concerned. The atoms defining the conductivity of the surface zone may, if desired, be absorbed from a thin layer of material containing these atoms applied to the image electrode prior to the thermal treatment.

In the embodiment described above, in which the semi-conductive material of the image electrode is mainly formed by lead monoxide in which on the side of the signal electrode a zone of n-conductivity is provided by the absorption of bismuth atoms or antimony atoms, a zone of p-conductivity may be obtained at the surface of the image electrode by carrying out the thermal treatment in an oxygen atmosphere; the desired surface zone may, as an alternative, be obtained by applying by vaporisation a thin layer of silver oxide to the image electrode prior to the thermal treatment.

As a further alternative, the image electrode for use in a camera tube according to the invention may be manufactured in a manner such that during the gradual formation of the image electrode on the signal electrode, for example by vaporisation, at the beginning of this formation, simultantously with the application of the semi-conductive material of the image electrode, an element or a compound thereof is precipitated which, being absorbed in the first mentioned material, provides a definite conductivity type of this material, in that subsequently the application of this impurity element is terminated, while the application of the image electrode material is continued, during which continued application the material of the image electrode is applied by vaporisation in conjunction with a second impurity element or a compound thereof. This second element must be suitable to give the electrode material last applied a conductivity type opposite to that given by the absorption of the first-mentioned impurity element.

For instance, during the manufacture of an image electrode of lead monoxide by vaporisation at the beginning of the process, bismuth or bismuth trioxide may be applied by vaporisation simultaneously with the lead monoxide, while at the end of the process which is preferably carried out in an oxygen atmosphere in order to avoid reduction of the lead monoxide, simultaneously with the lead monoxide silver or silver oxide is applied by vaporisation. It will depend on circumstances, whether after this application by vaporisation an additional thermal treatment in an oxygen atmosphere is still required.

It should be noted that for a great resolving power the surface conductivity of the image electrode of a camera tube must be small, so that a minimum amount of charge leaks away from one image element to adjacent image elements. For an image electrode of a camera tube according to the invention this may restrict the permissible concentration in the surface zone of those atoms which determine the conductivity type of this zone.

The invention will now be described with reference to the accompanying drawing, which shows a preferred embodiment, and in which.

Figure 1:
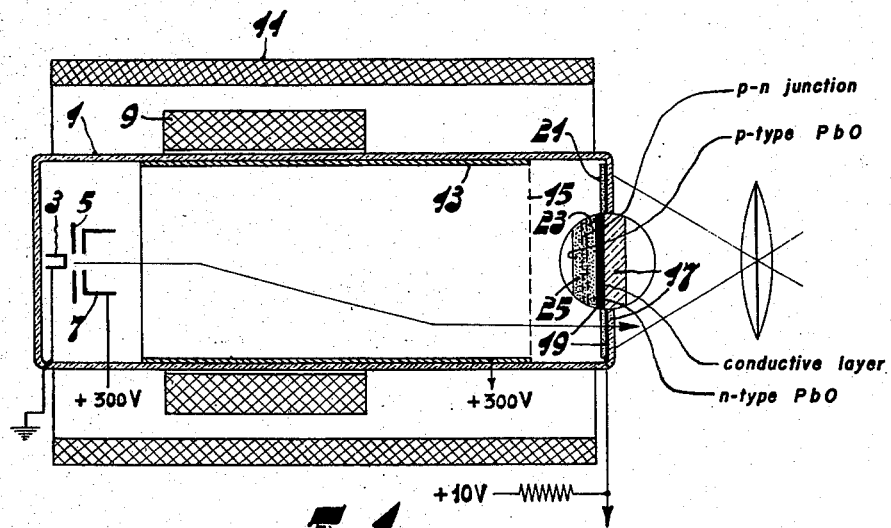
Fig. 1 is a diagrammatical sectional view of a camera tube for television purposes, the insertion showing part of the front wall with the image electrode on an exaggerated scale.

The camera tube shown in Fig. 1 comprises an exhausted envelope 1, in which an electron emitting cathode 3, a grid 5 and an accelerating anode 7 are housed. The envelope 1 is surrounded by deflector coils 9 and a focusing coil 11. On the inner side of the wall of the envelope 1 provision is made of a coating 13, which is connected on the front side to a grid 15.

On the inner side of the transparent glass front wall 17 of the tube provision is made of a transparent layer 19 of good conductivity, constituting the signal electrode. It may be formed by a layer of gold, iridium or platinum, applied by vaporisation of volatilisation, its thickness being materially smaller than 1 micron. The signal electrode 19 supports the photo-conductive image electrode 21, which is mainly made of lead monoxide and which has a thickness of about 5 microns. The image electrode 21 has a zone 23 adjacent the signal electrode 19, this zone having n-conductivity and being obtained in a manner to be described more fully hereinafter by the absorption of atoms of a trivalent element, in this case bismuth in the lead monoxide. On the side of the free surface the image electrode 21 has a zone 25, which has p-conductivity owing to an excessive quantity of oxygen atoms, or a deficient quantity of lead atoms. The boundary of the two zones 23 and 25 is considerably less sharply defined than is shown in the figure; at this transitional area a n-p-barrier is formed, which barrier has a blocking effect, if the signal electrode, as is indicated in the figure, is positive relative to the surface of the image electrode, which is stabilised on cathode potential in the embodiment shown.

Figure 2:
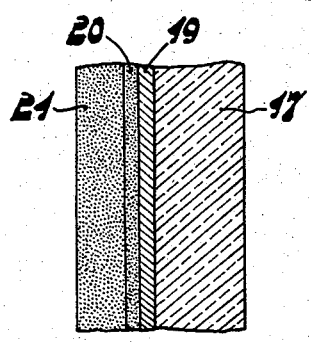
Fig. 2 shows, on an exaggerated scale, part of the front wall with the image electrode of the camera tube shown in Fig. 1 during the manufacturing process.

Fig. 2 shows part of the glass front wall 17 with the signal electrode 19 and the image electrode 21 during the manufacture of the latter. To the glass front wall first the signal electrode 19 is applied and then an intermediate layer 20 of not more than a few microns in thickness. The intermediate layer is made of bismuth trioxide; it may, however, also be made of a mixture of this substance and lead monoxide. By vaporisation the intermediate layer 20 has applied to it a layer 21 of about 5 microns in thickness of lead monoxide. After the said layers have been applied to the front wall 17, they are sintered at a temperature of 150° C. to 250° C. in an oxygen atmosphere of about 5 cm. Hg pressure for about one hour. The sintering temperature, the oxygen pressure and the sintering time depend upon one another and, moreover on other factors, such as the thickness and the composition of the various layers and the conditions of vaporisation. The most favourable combination must be found by experiment.

During the thermal treatment the boundary between the semi-conductive layer 21 and the intermediate layer 20 gradually vanishes. By the absorption of the bismuth atoms or antimony atoms from the intermediate layer 20 in the lead monoxide of the image electrode a zone 23 of n-conductivity in the PbO formed on the side of the image electrode adjacent the signal electrode. During the thermal treatment oxygen is absorbed in the layer 21, so that a zone (25 in Fig. 1) in the PbO layer obtains p-conductivity. The absorption of the oxygen atoms and of the bismuth atoms from the intermediate layer 20 in the semi-conductive layer 21 must, of course, not be such that either of these atoms predominates in the whole of the layer 21 and thus would give the image electrode throughout the same conductivity type.

Instead of containing bismuth trioxide, in conjunction with lead monoxide as the case may be, the intermediate layer may contain, as an alternative, antimony oxide in conjunction or not in conjunction with lead monoxide. The zone 23 may be obtained, as an alternative, if the intermediate layer 20 is constituted by a layer of only bismuth or antimony applied by vaporisation.

The image electrode of the camera tube according to the invention, described above by way of example, has, in the unexposed condition, an RC-time (discharge time) of a few seconds, while its decay time is smaller than $\frac{1}{50}$ sec. Thus the camera tube is very suitable for use as a television camera tube. The image electrode of this tube is sensitive not only to visible light, but also to ultraviolet light and to X-rays, the latter being strongly absorbed by the lead monoxide. Thus the tube is also very suitable for carrying out X-ray examinations. In this case it is advantageous to make at least that part of the envelope 1 which forms the front wall 17 from a kind of glass which absorbs X-rays to a small extent. This is the case, if the glass contains only light elements; an example of this kind of glass is that commercially obtainable under the registered tradename of "Pyrex."

What is claimed is:

1. A camera tube of the type employing a photo-conductive image electrode and scanning means for said image electrode, wherein said image electrode is constituted of a single semi-conductive material and contains a blocking layer.

2. A camera tube of the type employing a photo-conductive image electrode and electron beam scanning means for said image electrode, wherein said image electrode comprises a conductive layer, a layer of semi-conductive material on said conductive layer and including a rear surface adjacent the conductive layer and a front surface accessible to the electron beam, and contiguous p-type and n-type conductivity portions of the same said semi-conductive material forming a p-n junction between the front and rear surfaces of the semi-conductive layer.

3. A camera tube as set forth in claim 2 wherein the portion of the semi-conductive layer immediately adjacent the conductive layer is constituted of n-type semi-conductive material, and the portion of the same semi-conductive material adjacent its front surface is constituted of p-type material, said semi-conductive material being a polar substance.

4. A camera tube as set forth in claim 2 wherein the semi-conductive material is constituted of lead monoxide.

5. A camera tube as set forth in claim 4 wherein the n-type portion of the semi-conductive layer consists essentially of bismuth-doped lead monoxide.

6. A camera tube as set forth in claim 4 wherein the n-type portion of the semi-conductive layer consists essentially of antimony-doped lead monoxide.

7. A camera tube as set forth in claim 4 wherein the p-type portion of the semi-conductive layer consists essentially of lead monoxide containing a quantity of oxygen atoms in excess of its stoichiometrical quantity.

8. A camera tube as set forth in claim 4 containing an envelope including a glass portion adjacent the image electrode, wherein said portion is constituted of X-ray transparent elements.

9. A camera tube containing an image electrode of the photo-conductive type and electron-beam scanning means for scanning the image electrode, said image electrode comprising a transparent conductive support, a semi-conductive layer on said support having a layer portion adjacent the conductive support of one conductivity type and another layer of the same semi-conductive material remote from the conductive support of the opposite conductivity type with a junction layer therebetween, and means biasing said junction layer in the blocking direction.

10. A camera tube containing an image electrode of the photo-conductive type and electron-beam scanning means for scanning the image electrode, said image electrode comprising a transparent conductive support, a semi-conductive layer constituted of a polar substance on said support having a layer portion adjacent the conductive support of n-type conductivity and another layer remote from the conductive support of p-type conductivity with a junction layer therebetween, said electron-beam scanning means including a cathode and producing low velocity electrons which establish cathode potential on the surface of the p-type layer, and means applying a positive potential to the conductive support to thereby bias the junction in the blocking direction.

11. In a camera tube as set forth in claim 10 wherein the semi-conductive layer is constituted of lead monoxide.

References Cited in the file of this patent

UNITED STATES PATENTS

| | | |
|---|---|---|
| 2,177,736 | Miller | Oct. 31, 1939 |
| 2,211,145 | Miller | Aug. 13, 1940 |
| 2,211,146 | Miller | Aug. 13, 1940 |
| 2,520,244 | Iams | Aug. 29, 1950 |
| 2,555,091 | Lubszynski | May 29, 1951 |
| 2,622,219 | Schagen | Dec. 16, 1952 |
| 2,654,852 | Goodrich | Oct. 6, 1953 |
| 2,654,853 | Weimer | Oct. 6, 1953 |
| 2,687,484 | Weimer | Aug. 24, 1954 |
| 2,703,296 | Teal | Mar. 1, 1955 |
| 2,730,638 | Cashman | Jan. 10, 1956 |
| 2,763,581 | Freedman | Sept. 18, 1956 |